Sept. 20, 1938.                J. F. PETERS                    2,130,899
                          REMOTE CONTROL SYSTEM
                           Filed May 11, 1935              2 Sheets-Sheet 1
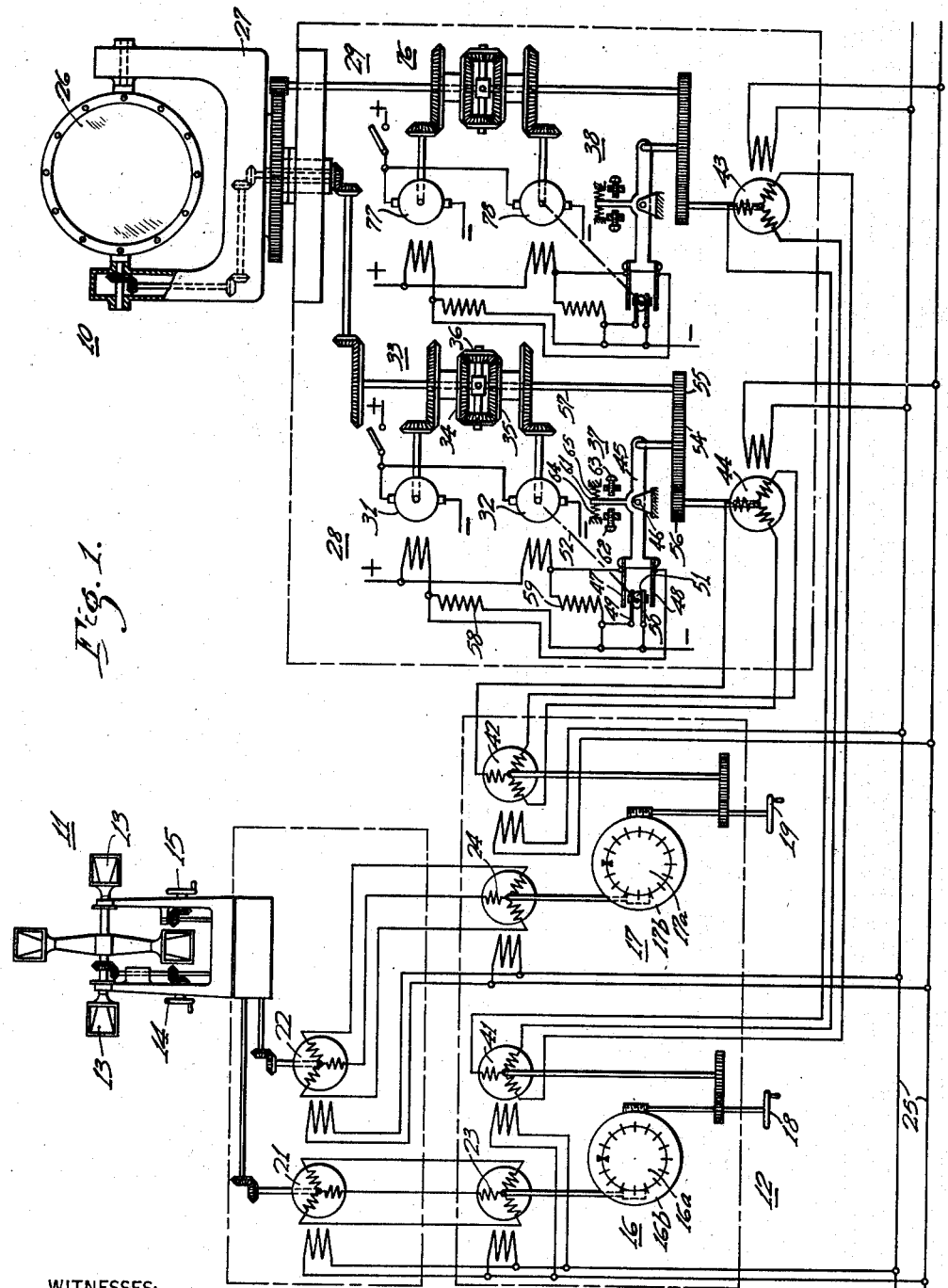
WITNESSES:                                              INVENTOR
                                                        John F. Peters.
                                                        BY
                                                           ATTORNEY

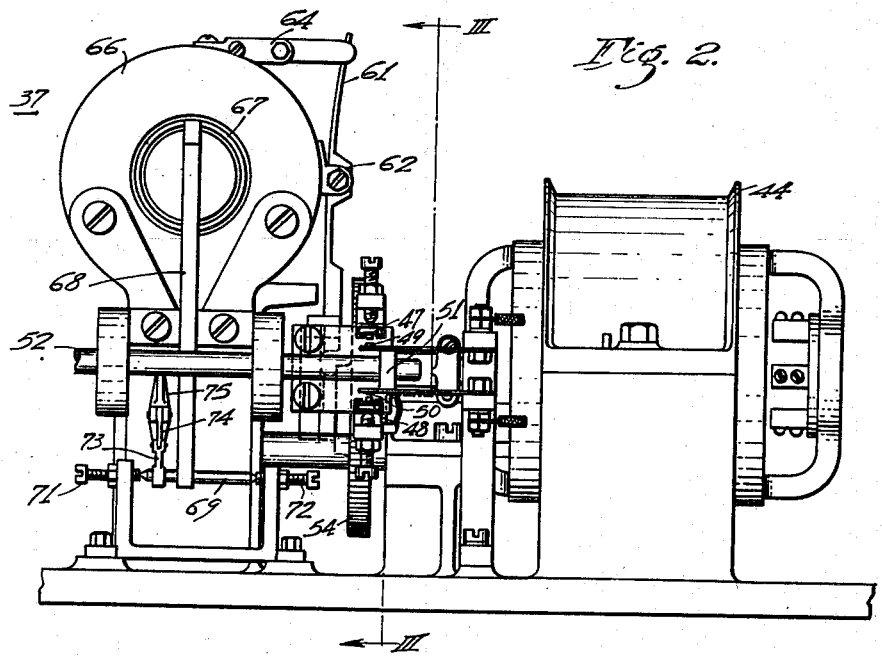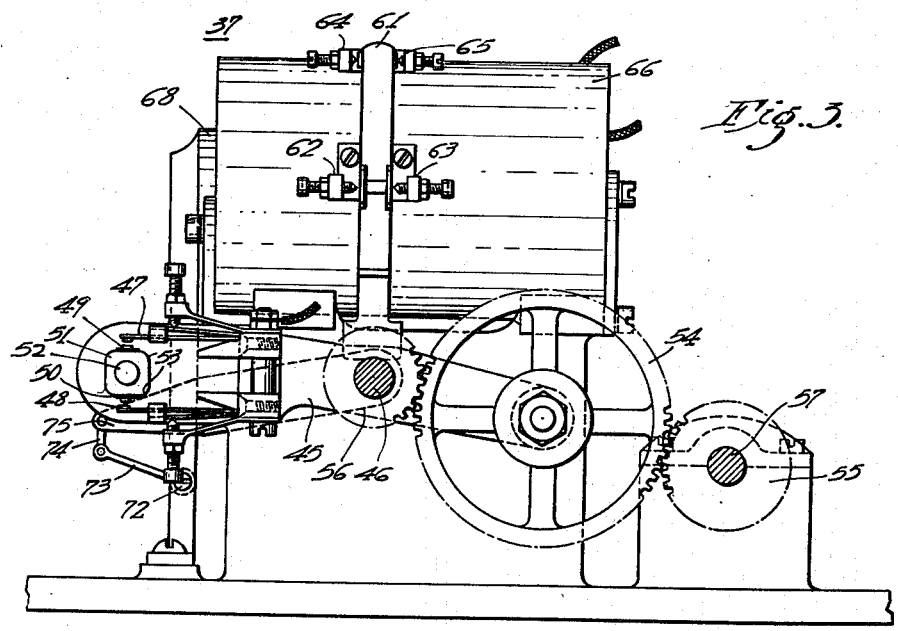

Patented Sept. 20, 1938

2,130,899

UNITED STATES PATENT OFFICE 2,130,899

REMOTE CONTROL SYSTEM

John F. Peters, Edgewood, Pa., assignor to Westinghouse Electric & Manufacturing Company, East Pittsburgh, Pa., a corporation of Pennsylvania Application May 11, 1935, Serial No. 21,010

9 Claims. (Cl. 172—239)

My invention relates, generally, to remote control systems of the synchronous position or follow-up type and regulating devices for controlling the angular displacement of a driven object, such as a searchlight, gun or the like, in accordance with the angular displacement of a controlling object.

In controlling the movements of objects in the nature of searchlights, gun turrets and the like from a remote point in accordance with the movements in elevation and azimuth, or both, of a sound locator, sighting telescope or any other control device it is necessary to provide a control which is accurate and positive in operation, of rugged construction and which involves a minimum amount of apparatus. Furthermore, it is highly desirable to actuate the object by power units or devices which are located thereon or in close proximity thereto and to utilize means for controlling the operation of the power units which is accurate and fool-proof in operation and which requires the transmission of a minimum amount of power from the remote controlling station to the object to be controlled.

In addition it is highly desirable to provide a control which responds quickly and accurately to all of the operations initiated at the control station, and which will operate over a relatively wide range without appreciable error.

Heretofore, various forms of control for applications of this kind have been suggested and used which have certain limitations and disadvantages in that they are expensive to build and maintain, complicated in design, delicate and therefore affected by disturbances which cannot be controlled and are not extremely accurate and reliable under all operating conditions to which they may be subjected. It is, therefore, the purpose of this invention to provide a control system of the general type described which shall overcome the limitations and disadvantages of the present systems.

The object of my invention, generally stated, is to provide a remote control system of the synchronous position or follow-up type which shall be of simple and rugged construction, efficient and accurate in operation and which may be readily and economically manufactured, installed and operated.

A more specific object of my invention is to provide for accurately controlling the movements of a driven object from a remote control station by means of a synchronous transmitting system which is utilized to control the driving or actuating power applied to the driven device.

Another object of my invention is to provide for accurately controlling the movements of a remotely disposed object from a control station by means of a synchro-tie system and mechanical power unit associated with the object and controlled by the synchro-tie system.

A further object of my invention is to provide for effecting predetermined movements of a remotely disposed object or device by means of a differential power unit associated with the object and which is controlled from a control station by an electrical follow-up system.

A still further object of my invention is to provide for utilizing a remotely-controlled regulator for controlling the functioning of a power unit which may be utilized to control the movements of an object or device associated therewith.

Another object of my invention is to provide a power unit, for controlling the movements of an object comprising a mechanical differential having a plurality of variable speed driving elements controlled by a regulator device.

A still further object of my invention is to provide for controlling the movements of an object by means of a mechanical regulator jointly controlled from a control station and in accordance with the movements of the controlled object.

Another object of my invention is to provide for controlling the operation of a power device from a remote station by means of a mechanical regulator associated with the power device and controlled from the central station by a position reproducing system.

Another object of my invention is to provide a position reproducing system which shall not require the use of electronic devices to obtain accuracy, which shall be extremely rugged and fool-proof and which is unaffected by shock, vibration, position or atmospheric conditions.

Still another object of my invention is to provide a regulator device which is of simple construction, efficient in operation and which may be readily and economically manufactured and installed.

A further object of the invention is to provide a regulator suitable for controlling the operation of a power unit in accordance with the movements of an object driven by the power unit.

A still further object of my invention is to provide a mechanical regulator device of the vibratory type which may be subjected to remote control and which is operable to control the movements of a power-driven object in accordance with the position of the object.

These and other objects of my invention will become evident from a study of the following detailed description in conjunction with the drawings in which:

Figure 1 is a diagrammatic view of a remote control system for searchlights and the like embodying the principal features of the invention;

Fig. 2 is a side elevational view of the regulator device shown schematically in Fig. 1; and Fig. 3 is a sectional view taken along lines III—III of Fig. 2.

In practicing my invention, as it may be applied for controlling the movements in elevation and azimuth of a searchlight, gun or the like, there is utilized a power unit comprising a differential gear unit and a plurality of driving motors for controlling each movement. The power units are so arranged that when both motors are running at the same speed, or at any other predetermined speed ratio, no movement of the driven object occurs but when this speed ratio is changed a movement of the driven object occurs in accordance therewith.

The relative speeds of the driving motors of each power unit are controlled by means of a regulator device which functions to control the relative speeds of the motors in accordance with the desired movement of the object. The regulator in each instance is jointly controlled in accordance with the position of the object and by a position reproducing system operated from a control station. The position reproducing system is actuated in accordance with the desired movement of the object which causes the regulator and power unit to function to produce the desired movement. The movement of the object is reflected into the regulator to arrest the movement when the desired position has been reached and restore the regulator to its normal or neutral position. The regulator in its normal position maintains the predetermined speed ratio between the motors of the power unit and no movement of the objects occurs until the position duplicating system is actuated.

Referring to Fig. 1 of the drawings there is disclosed a system for remotely controlling the movements in elevation and azimuth of a searchlight 10 in accordance with the corresponding movements of a sound locator or detector 11 from a remote control and comparator station 12.

Since the nature and method of operation of the sound locator 11 is well known it will not be described in detail except to state that it comprises generally a plurality of sound horns 13 rotatably mounted for movements in both elevation and azimuth in order to point the horns toward a sound source such as an aeroplane or the like. The horns 13 may be moved in elevation by the hand wheel 14 and in azimuth by the hand wheel 15 which rotates the support for the horns in a well known manner.

The remote control and comparator station 12 is illustrated diagrammatically and comprises a pair of azimuth dials 16 and a pair of elevation dials 17, which are utilized in conjunction with apparatus to be described by the operator to determine the relative positions of the sound locator and searchlight. In each instance the inner dials 16a and 17a are moved in accordance with the movements of the sound locator and the outer dials 16b and 17b in accordance with the position of the searchlight by means of the handwheels 18 and 19, which are geared thereto as shown.

In order to provide for actuating the inner dials 16a and 17a in accordance with the movements in elevation and azimuth of the sound locator, synchro-tie units comprising transmitters 21 and 22 and receivers 23 and 24 are interposed between the sound locator and comparator station. The transmitter and receiver of each unit have their field windings connected to a common source of alternating current power 25 and their rotors connected in parallel and function in a well known manner to actuate their associated dials in accordance with the angular displacement in elevation and azimuth of the sound locator.

It is to be understood further that the transmitters 21 and 22 may constitute a part of the sound lag corrector (not shown) which is usually used in connection with the sound locator in order that the movements of the transmitters 21 and 22 will be in accordance with the true sound source and that the movements of the comparator dials will be in accordance with the corrected sound locator data.

The searchlight 10 comprises generally a drum element 26 rotatably mounted upon a supporting element 27 which is also rotatably mounted for movements in azimuth.

In order to provide for actuating the searchlight in elevation and azimuth movements, elevation and azimuth power units 28 and 29, respectively, are provided. Since these power units are identical only the elevation unit 28 will be described in detail.

In accordance with the principles of this invention the power for actuating the searchlight drum 26 in elevation is produced by a pair of motors 31 and 32 connected to the searchlight through a differential gear mechanism 33 as shown. The motors are connected to the sun-gears 34 and 35 of the differential mechanism in such manner that the planetary element 36 revolves in a direction and at a speed dependent upon the relative speed relation of the driving motors. Assuming that the gear ratios are equal, no movement of the planetary element which is connected to the drum occurs when the motors are operating at equal speeds in opposite directions or at any other speed ratio dependent upon the gear ratios employed. Movement of the planetary element 36 occurs whenever the normal speed relation is altered. If the speed of the motor 31 is increased the drum is moved in one direction at a speed corresponding to the degree of change in the relative speeds of the motors. The same result is produced by reducing the speed of motor 32. Movement of the drum in the opposite direction in elevation may be effected by increasing the speed of motor 32 or decreasing speed of motor 31, or both.

Thus it is apparent that the differential power units are very flexible and smooth in their operation and may be readily controlled by controlling the relative speeds of the driving motors.

In order to provide for controlling the operations of the power units 28 and 29 from the comparator and remote control station 12, regulators 37 and 38 are utilized in conjunction with synchro-tie units comprising transmitters 41 and 42 and receivers 43 and 44, respectively, having their field windings connected to the source 25 and their rotors connected in parallel as described hereinbefore.

Before describing the operation of the system further reference should now be had to Figs. 2 and 3 of the drawings in order that the construction of the regulators may be understood.

It will be assumed that the regulator shown in Fig. 1 is the elevation regulator 37. The dynamo-electric machine is the receiver 44 of Fig. 1. The regulator illustrated is of the mechanical vibrating type and is so constructed that it may be jointly controlled from a remote station and by the movements of the driven object.

The regulator comprises generally a movable arm or lever 45 pivotally mounted at 46. Upon one end of the arm is mounted a pair of adjustable contact elements 47 and 48 which cooperate with flexible stationarily mounted contact elements 49 and 50. The vibratory action of the contact elements in this instance is produced by a cam 51 which is rotated at a high rate of speed by the shaft 52 which may be driven in any suitable manner such for example as by one of the motors 32 of the power unit.

The cam 51 is provided with a plurality of lobes 53 which actuate the flexible contact elements 50 and 49 into engagement with their associated adjustable contact elements.

It will be readily understood that the relative periods of engagement of the associated pairs of contact elements may be varied by the movement of the pivotally-mounted lever 45. In order to control the movements of the lever 45 it is provided at its opposite end with a gear wheel 54, which is rotatably mounted thereon. The gear wheel 54 engages gear wheels 55 and 56. The gear wheel 55 is secured to a shaft 57 which may be rotated in accordance with the position of the driven object. The gear wheel 56 is mounted on the shaft of the receiver 44 having its axis of rotation co-incident with the axis of rotation of the lever 45.

In view of the foregoing it will be readily understood that the lever 45 carrying the contact elements 47 and 48 may be caused to swing slightly in either direction by rotating the gear wheel 56 since at the instant the gear wheel 56 starts to rotate the gear wheel 55 is stationary and the gear wheel 54 pivots about its point of engagement with the gear wheel 55.

As shown more clearly by the diagram of Fig. 1, the pairs of contact elements of the regulator are connected to control the effectiveness of the resistors 58 and 59 in the field circuits of the motors 31 and 32. The resistors and contact elements may be so adjusted that when the lever 45 of the regulator is in its normal or neutral position as show the relative periods of engagement of the contact elements is such as to cause the motors to operate at equal speeds in opposite directions and no movement of the planetary element of the differential mechanism occurs.

As soon, however, as the receiver 44 rotates the gear wheel 56 a slight amount, the lever 45 is moved about its pivot point in a direction determined by the direction of rotation of the receiver 44 and thus the relative periods of engagement between the respective pairs of contact elements are varied in such manner as to modify the relative speeds of the motors to cause the driven object to be moved in one direction or the other.

As soon as the planetary element of the differential begins to rotate, the gear 55 is rotated in a direction to restore the pivoted regulator arm 45 to its neutral or normal position which restores the contact elements of the regulator, and consequently, the relative field excitations of the motors to their normal condition. It is thus apparent that the driven object is always moved in accordance with the movement of the receiver 44 and that the movements of the object always restore the regulator to its normal neutral position as soon as the receiver stops. In other words, the driven object follows closely the movements of the receiver 44 regardless of speed or direction. Continuous operation of the receiver produces continuous movement of the object.

In order to decrease the tendency of the regulator to oscillate, provision is made to definitely limit its total travel or in other words to limit the travel of the pivoted lever 45. This may be done by means of an arm 61 secured to the same shaft which supports the lever 45 and adjustable stops 62 and 63 which may be adjusted to determine the range of movement of the arm.

This same arm 61 may be also used in conjunction with adjustable spring elements 64 and 65 to control the rate of the mechanical period of vibration of the lever 45 between its limits of travel as determined by the stops 62 and 63.

In order to steady the operation of the regulator, it is provided with a damper device of the magnetic type although it is apparent that other types may be used. In this embodiment of the invention, the damper comprises a coil 66 and a metallic vane 67 disposed for movement within the air gap of the coil. The vane 67 is supported on an arm 68 secured to a shaft 69, pivotally mounted on adjustable bearings 71 and 72 as shown best in Fig. 2. The shaft 69 is connected to the pivoted contact carrying arms 45 of the regulator by means of levers 73, 74 and 75. It will be readily understood that this device functions to steady and smooth out the movements of the lever 45 because of the damping force produced by the coil and vane.

Thus it is now apparent that provision is made for fixing the limits of travel of the moving element of the regulator, fixing the rate of the mechanical period of vibration and steadying its operation in order to insure the best possible operation and thereby obtain a high degree of accuracy and smoothness in the control of the movements of the driven object.

The power unit 29 and regulator 38 for controlling the movements of the searchlight in azimuth are similar to those described hereinbefore for controlling the movements in elevation. The power unit 29 comprises generally a differential gear unit 76 and a pair of driving motors 77 and 78, the planetary element of the differential being geared to the searchlight and to the regulator 38 as shown.

In describing the operation of the system it may be assumed that the driving motors of the respective power units 28 and 29 are energized and are operating at such speeds as to maintain the searchlight stationary. The operations of the sound locator 11 effects the operation of the inner dials of the indicators 16 and 17 in accordance therewith through the functioning of the synchro-tie units which indicates to the operator of the remote control station 12 the position of the sound locator.

By means of the handwheels 18 and 19 which are geared both to the outer dials of the indicators and the transmitters 41 and 42, the operator may cause the searchlight to follow the movements of the sound locator. The rotation of the handwheel 19 initiates the operation of the regulator 37 in a direction depending upon the direction of rotation of the hand wheel. This will cause the pivoted arm 45 of the regulator to swing in one direction or the other to unbalance the relative field excitations of the driving motors 31 and 32. In this instance if the contact carrying end of the regulator arm 45 swings upwardly, the period of engagement between contact elements 48 and 50 will become greater than that between contact elements 47 and 49 to effect an increase in the excitation of the motor 31 and a decrease in the excitation of the motor 32.

It will be readily understood that this modifies the normal speed ratio of the motors which causes the planetary element 36 of the differential to revolve in the direction corresponding to the direction of rotation of the fastest motor thereby actuating the searchlight drum and the regulator 37 in a manner described hereinbefore.

It is apparent that so long as the handwheel 19 is turned, continuous movements of the searchlight in elevation result as the continuous movement of the transmitter 42 and receiver 44 causes the regulator 37 to function continuously to unbalance the speed of the motors in the desired direction.

The operation of the handwheel 18 produces exactly the same results except that in this instance the power unit 29 is the cause to effect movements of the searchlight in azimuth.

It will be observed that in this instance the dials of the indicators 16 and 17, which indicate the positions of the searchlight are actuated directly by the control handwheels 18 and 19, respectively, and that these dials are not in any way effected directly by the movements of the searchlight. The elimination of any direct control between the searchlight and the dials which indicate its position is possible in this instance because of the accuracy with which the system operates. In other words, the movements of the handwheels correspond to predetermined movements of the searchlight and since the movements of the handwheels are accurately reproduced by the remote control system it makes possible the operation of the dials directly by the handwheels. This is an important feature of the invention which makes it less complicated and more economical to manufacture.

While the invention has been illustrated and described in connection with the control of antiaircraft searchlights, it will be readily understood that the remote control principles herein described are suitable for many other applications where an accurate reproduction of angular motion is necessary. This system is of simple and rugged construction in which no electronic tubes or delicate control devices of any kind are utilized thereby making it especially suitable for applications where all apparatus is subjected to severe vibration and atmospheric conditions.

It may be stated, in conclusion, that while the illustrated example constitutes a practical embodiment of my invention, I do not wish to limit myself strictly to the exact details herein illustrated since modifications of the same may be made without departing from the spirit of the invention as defined in the appended claims.

I claim as my invention:

1. In a system for selectively controlling the movements of an object from a remote station, in combination, power means for actuating the object, a position duplicating system operable in accordance with the desired movements of the object, and regulator means continuously operated from the power means and jointly responsive to the position of the object and the operation of the position duplicating system for controlling the power means.

2. The combination with a movable object, of a power unit comprising a differential gear and a plurality of driving motors for actuating the movable object, a regulator device continuously operated by one of said motors for controlling the relative speeds of the motors whereby said object is normally stationary, means whereby the regulator may be controlled to cause the power unit to effect a desired movement of the object, and means whereby the regulator is controlled in accordance with the position of the object to arrest said movement of the object when a desired position has been reached.

3. In a follow-up system for driving an object into positional agreement with a controlling device comprising, a differential gear unit connected to drive the object, a pair of motors connected to drive the differential gear unit, a source of power for the motors, a regulator having a continuously driven element operable to simultaneously control the excitation of both motors to control the relative speeds thereof, said regulator being normally operable to hold the relative speeds of the motors in such relation as to produce no movement of the object, and an electrical position transmitting system disposed to be actuated by the controlling device for controlling the operation of the regulator to vary the relative motor speeds from normal.

4. In a follow-up system for driving an object into positional agreement with a controlling device comprising, a pair of motors, a source of power for the motors, a differential gear unit connecting the motors to the object, a mechanical regulator continuously actuated by one of said motors and operable to control the relative speeds of the motors, said regulator being normally operable to hold the relative speeds of the motors in such relation as to produce no movement of the object and adjustable to produce relative speed variation in both directions, and means responsive to positional disagreement of the object and controlling device for controlling the adjustment of the regulator.

5. A regulator device for controlling the operation of a motor-operated power unit connected to drive a movable object in accordance with the movements of a controlling device comprising, a continuously vibrating contact element, an adjustable contact element cooperating therewith to control the operation of the motor-operated power unit, said adjustable contact element having a neutral position, means responsive to the operation of the controlling device for actuating the adjustable contact element from its neutral position to effect the operation of the motor-operated power unit, and means actuated in accordance with the movement of the power unit for returning the adjustable contact element to its neutral position.

6. A regulator device for controlling the operation of a pair of motors driving an object through a differential gear unit comprising, a pair of vibratory contact making elements, means adapted to be actuated by one of the motors for continuously vibrating said elements, a pair of adjustably-mounted contact elements cooperating with said vibratory elements for simultaneously controlling the relative field excitation of the motors to control their relative speeds, control means for varying the position of the adjustable contact elements to effect variations in the relative speeds of the motors, and mechanical means driven from the differential gear unit for varying the position of the adjustable contact elements in the opposite sense to that effected by the control means.

7. The combination with a movable object, of power means for moving said object, a distant control for said power means comprising a transmitting element and a receiving element, and a regulator having a continuously driven element and a cooperating element jointly controlled by the receiving element and in accordance with the position of the object for controlling the speed and direction of movement of the power means, whereby the movements of the object are in accordance with the movements of the transmitting element.

8. In a system for controlling the position of a movable object, a controlling device, power means including a differential gear device and a pair of driving motors for actuating the object and means including a regulator device driven by one of said motors and controlled by said controlling device and said differential gear device for controlling the relative speeds of said motors, whereby the object is caused to follow the movements of the controlling device.

9. In combination with a movable object, a differential mechanism directly connected to said object, a plurality of variable speed motors connected to drive said differential mechanism, a regulator having continuously driven means for controlling the speeds of said motors and having means for controlling the relative speeds of said motors, and means comprising a remote control device and mechanism controlled in accordance with the movement of the object for controlling the relative motor speed control means.

JOHN F. PETERS.